US012747170B2

(12) United States Patent
Dang

(10) Patent No.: US 12,747,170 B2
(45) Date of Patent: Sep. 29, 2026

(54) WATER SUPPLY SYSTEM

(71) Applicant: DISCO CORPORATION, Tokyo (JP)

(72) Inventor: Van Tuan Dang, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 353 days.

(21) Appl. No.: 18/441,203

(22) Filed: Feb. 14, 2024

(65) Prior Publication Data

US 2024/0294404 A1 Sep. 5, 2024

(30) Foreign Application Priority Data

Mar. 3, 2023 (JP) ................................ 2023-032815

(51) Int. Cl.
*C02F 1/42* (2023.01)
*C02F 103/04* (2006.01)

(52) U.S. Cl.
CPC ............ *C02F 1/42* (2013.01); *C02F 2103/04* (2013.01); *C02F 2307/00* (2013.01)

(58) Field of Classification Search
CPC ........ C02F 1/42; C02F 1/008; C02F 2307/00; C02F 2103/04; C02F 2103/02; C02F 2209/05; C02F 2301/08
See application file for complete search history.

(56) References Cited

U.S. PATENT DOCUMENTS 4,698,153 A * 10/1987 Matsuzaki ......... B01D 11/0203 210/900
5,811,012 A * 9/1998 Tanabe ...................... C02F 1/44 210/257.2
2015/0336813 A1* 11/2015 Ikuno ...................... C02F 1/441
2021/0188670 A1* 6/2021 Takenouchi ....... B01D 21/0045

FOREIGN PATENT DOCUMENTS

JP 2015096254 A 5/2015
JP 2022186379 A 12/2022
WO WO-2019239853 A1 * 12/2019 ............. B01D 61/00

OTHER PUBLICATIONS

WO-2019239853-A1_English translation (Year: 2019).*

* cited by examiner

*Primary Examiner* — Youngsul Jeong
(74) *Attorney, Agent, or Firm* — Greer, Burns & Crain, Ltd

(57) ABSTRACT

A water supply system for supplying water to be used in a processing apparatus includes a water producing apparatus and a water adjusting apparatus. The water producing apparatus includes a first ion exchange resin column containing first ion exchange resin with which the water makes contact, and a first specific resistance meter for measuring a specific resistance of the water having made contact with the first ion exchange resin. The water adjusting apparatus includes a second ion exchange resin column containing second ion exchange resin with which the water supplied from the water producing apparatus makes contact, and a second specific resistance meter for measuring a specific resistance of the water having made contact with the second ion exchange resin.

8 Claims, 4 Drawing Sheets

WATER SUPPLY SYSTEM

BACKGROUND OF THE INVENTION

Field of the Invention

The present invention relates to a water supply system.

Description of the Related Art

In a processing apparatus such as a grinding apparatus or a cutting apparatus (dicing apparatus) used for manufacture of semiconductor devices, water of high purity is used for cleaning a workpiece or for cooling a processing tool. Such high-purity water is generally produced by removing impurities contained in water of low purity to a predetermined level by use of an apparatus installed outside the processing apparatus.

As an apparatus for producing high-purity water, for example, Japanese Patent Laid-open No. 2015-96254 describes a pure water purifying apparatus that is disposed adjacent to a cutting apparatus and is capable of supplying pure water to the cutting apparatus. In addition, Japanese Patent Laid-open No. 2022-186379 describes a cleaning apparatus including a clarifying unit that clarifies water having been used for cleaning of a body to be cleaned such as a wafer, to thereby produce pure water.

SUMMARY OF THE INVENTION

Depending on the environments for installation of a processing apparatus, there are cases where the apparatus for producing water of high purity cannot be installed in the vicinity of the processing apparatus, due to various restrictions. For instance, the apparatus for producing high-purity water may be installed outside a clean room in which the processing apparatus is installed, and the water may be supplied from the water producing apparatus to the processing apparatus through piping and the like.

In this case, however, the piping for conveying the water from the water producing apparatus to the processing apparatus is long, and hence, the possibility of mixing of impurities or the like into the water flowing through the piping is high. In short, in this case, there is a high possibility that the processing apparatus is supplied with water of low purity as compared to the case where the water producing apparatus is installed in the vicinity of the processing apparatus.

Accordingly, it is an object of the present invention to provide a water supply system capable of supplying a processing apparatus with water having purity higher than a predetermined level, irrespectively of the distance from an apparatus for producing high-purity water to the processing apparatus.

In accordance with an aspect of the present invention, there is provided a water supply system for supplying water to be used in a processing apparatus, the water supply system including a water producing apparatus and a water adjusting apparatus. The water producing apparatus includes a first ion exchange resin column containing first ion exchange resin with which the water makes contact, and a first specific resistance meter for measuring a specific resistance of the water having made contact with the first ion exchange resin. The water adjusting apparatus includes a second ion exchange resin column containing second ion exchange resin with which the water supplied from the water producing apparatus makes contact, and a second specific resistance meter for measuring a specific resistance of the water having made contact with the second ion exchange resin.

Preferably, the water producing apparatus is disposed outside a clean room in which the processing apparatus is installed, and the water adjusting apparatus is disposed inside the clean room.

Preferably, the water adjusting apparatus is installed inside a housing of the processing apparatus.

In the water supply system according to an aspect of the present invention, an ion exchange resin column and a specific resistance meter are provided in each of the water producing apparatus and the water adjusting apparatus, and the water supplied from the water producing apparatus is adjusted by the water adjusting apparatus, before being supplied to the processing apparatus. Hence, by disposing the water adjusting apparatus of the water supply system near the processing apparatus, water adjusted to have purity higher than a predetermined level can be supplied from the water adjusting apparatus to the processing apparatus, irrespectively of the distance from the water producing apparatus to the processing apparatus.

It is sufficient that the water adjusting apparatus includes at least an ion exchange resin column and a specific resistance meter, and it is not necessary for the water adjusting apparatus to have a tank for storing water, an ultraviolet (UV) ray source, and the like that may possibly be provided in the water producing apparatus. In other words, the space necessary for installation of the water adjusting apparatus is smaller than the space necessary for installation of the water producing apparatus, and hence, the water adjusting apparatus can be disposed at a position nearer to the processing apparatus than the water producing apparatus, such as inside a clean room, inside a housing of the processing apparatus, or the like.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
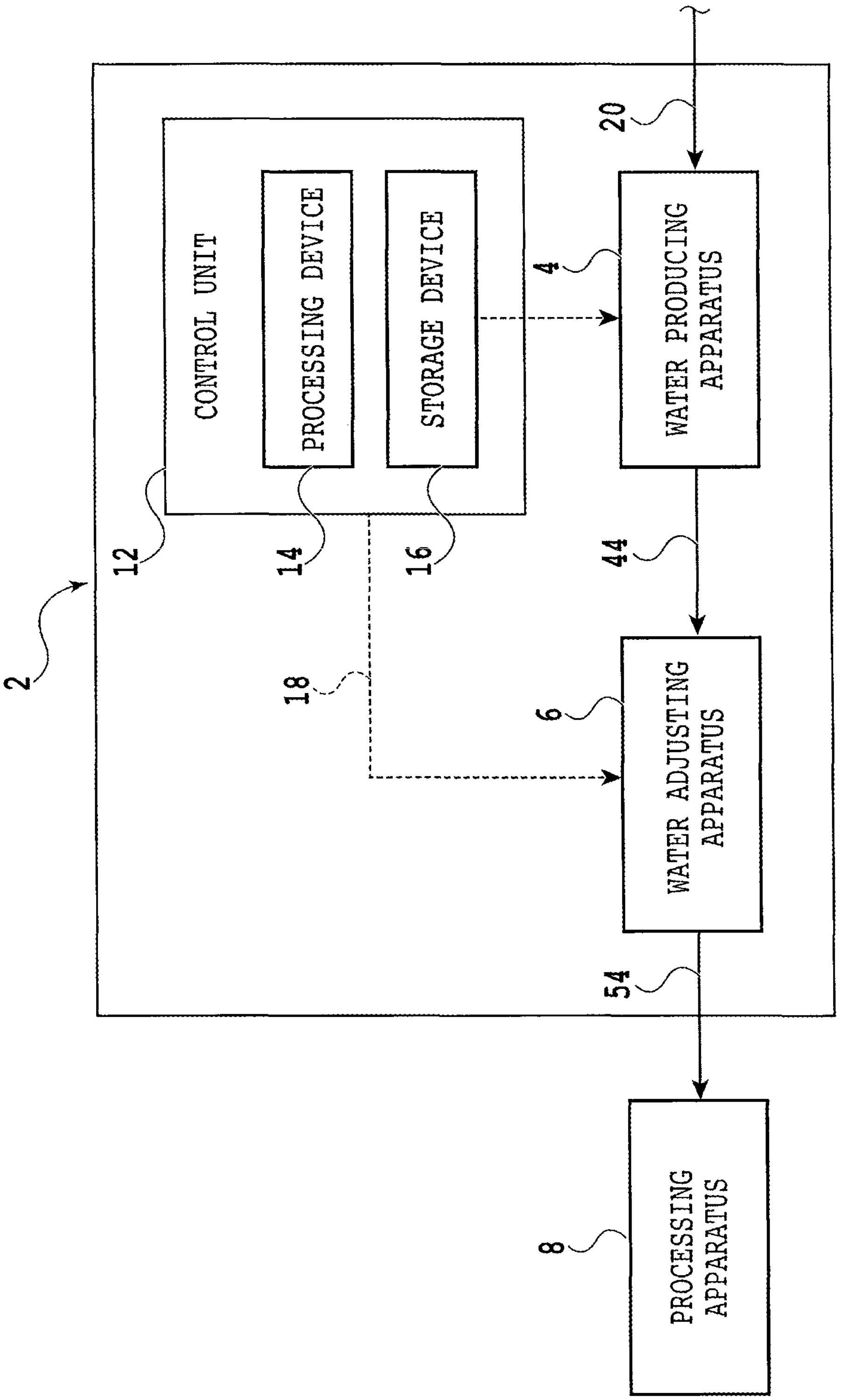
FIG. 1 is a block diagram depicting a water supply system according to an embodiment of the present invention.

An embodiment of the present invention will be described with reference to the attached drawings. FIG. 1 is a block diagram depicting a water supply system 2 according to the embodiment. As depicted in FIG. 1, the water supply system 2 according to the present embodiment includes a water producing apparatus 4 and a water adjusting apparatus 6. The water producing apparatus 4 is supplied with water (cleaning waste liquid or the like from a processing apparatus) from outside of the water supply system 2 through a channel (flow path) 20.

In addition, the water adjusting apparatus 6 is supplied with the water produced by the water producing apparatus 4 through a channel 44. Then, the water is adjusted to have purity higher than a predetermined level by the water adjusting apparatus 6, before being supplied to the processing apparatus 8 through a channel 54. Here, the water (pure water) having purity higher than the predetermined level herein refers to water having a specific resistance of not less than 12 MΩ·cm.

A control unit 12 is connected to the water producing apparatus 4 and the water adjusting apparatus 6. The control unit 12 has, for example, a computer including a processing device 14 and a storage device 16 and controls the water producing apparatus 4 and the water adjusting apparatus 6 by use of electrical signals 18.

The processing device 14 is typically a central processing unit (CPU) and performs various kinds of processing necessary for controlling the above-mentioned elements. The storage device 16 includes, for example, a main storage device such as a dynamic random access memory (DRAM), and an auxiliary storage device such as a hard disk drive and a flash memory. The functions of the control unit 12 are realized by, for example, operations of the processing device 14 according to a program stored in the storage device 16.

Figure 2:
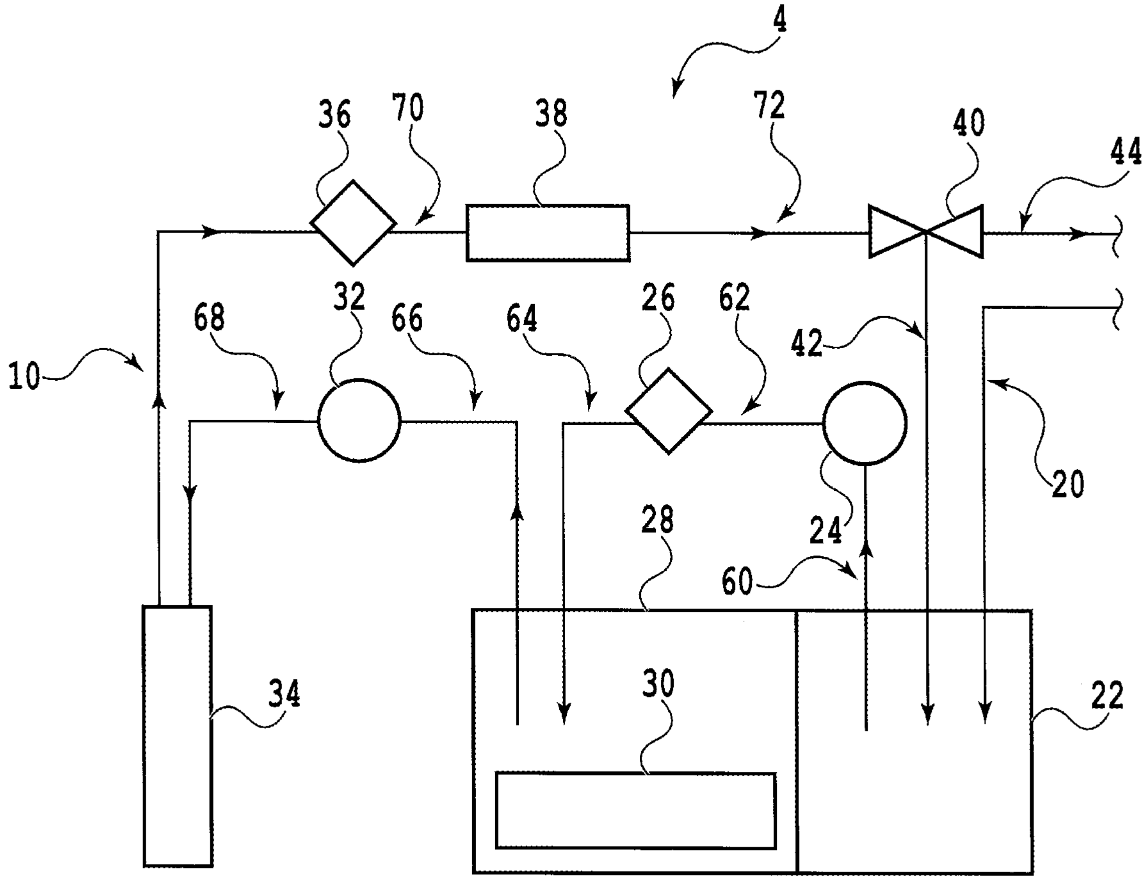
FIG. 2 is a diagram schematically depicting a configuration of a water producing apparatus depicted in FIG. 1.

Next, the water producing apparatus 4 and the water adjusting apparatus 6 constituting the water supply system 2 according to the present embodiment described above will be described in detail below. FIG. 2 is a diagram schematically depicting the water producing apparatus 4 depicted in FIG. 1. In FIG. 2, some of the channels are depicted in a simplified linear shape for convenience of description. The channels are formed by, for example, piping, tubes, or the like made of metal or resin.

The water producing apparatus 4 includes a first tank 22 connected to a terminal end of the channel 20. In the present embodiment, for example, cleaning water (waste liquid) after use which is discharged from the processing apparatus 8 and supplied to the water producing apparatus 4 through the channel 20 is a raw material for water having high purity. The cleaning water (waste liquid) discharged from the processing apparatus 8 is supplied to the first tank 22 through the channel 20 and is stored in the first tank 22. Specifically, water containing chemicals and foreign matters such as microorganisms and processing swarf is supplied to the first tank 22 as the waste liquid.

A first pump 24 is connected to the first tank 22 through a channel 60, and a filter 26 is connected to the first pump 24 through a channel 62. The first pump 24 is a pump for drawing up the water (waste liquid) stored in the first tank 22 and supplying the water to the filter 26 through the channel 62. By the first pump 24, the amount of the water supplied from the first tank 22 to the filter 26 is controlled.

The filter 26 is formed, for example, by use of activated carbon, zeolite, cloth, resin-made fibers, glass fibers, a metallic mesh, a reverse osmosis membrane (RO membrane), or the like. The filter 26 removes impurities such as processing swarf contained in the waste liquid drawn up by the first pump 24, by adsorption or filtering-out. In other words, the filter 26 filters the waste liquid to purify it into fresh water. A second tank 28 is connected to the filter 26 through a channel 64. The fresh water filtered by the filter 26 is accommodated into the second tank 28, which can accommodate the fresh water, through the channel 64.

A UV ray source 30 for applying UV rays to the fresh water accommodated in the second tank 28 is provided inside the second tank 28. The UV ray source 30 is, for example, a UV lamp, a UV fluorescent lamp, a UV light emitting diode (LED), or the like. In the water having been used for cleaning the processing apparatus 8, for example, microorganisms floating in the atmosphere are mixed as impurities. In view of this, the UV ray source 30 irradiates the fresh water with UV rays for sterilization of the fresh water. In addition, when the fresh water is irradiated with UV rays, other organic matters or the like contained in the fresh water can be decomposed.

Here, it is preferable that the UV rays applied from the UV ray source 30 to the fresh water contain a component of a wavelength of 254 nm and a component of a wavelength of 185 nm. When the fresh water is irradiated with the UV rays of a wavelength of 254 nm, the fresh water is sterilized. When the microorganisms have died, corpses thereof remain in the water as organic matters. In addition, other organic matters are also mixed in the fresh water. The UV rays of a wavelength of 185 nm activate ozone contained in the fresh water, to thereby accelerate decomposition of the organic matters constituting the corpses of the microorganisms and the other organic matters by ozone.

A second pump 32 is connected to the second tank 28 through a channel 66. The second pump 32 has a function of drawing up the fresh water from the second tank 28 and sending the fresh water into a channel 68 on the downstream side. Note that the UV ray source 30 may be provided in the channel 66 or the channel 68 through which the fresh water drawn up by the second pump 32 flows, and the fresh water flowing through the channel 66 and the channel 68 may be irradiated with the UV rays from the UV ray source 30.

A first ion exchange resin column 34 including first ion exchange resin is connected to an end on the downstream side of the channel 68. The first ion exchange resin column 34 exchanges ions contained in the fresh water having been irradiated with the UV rays by the UV ray source 30. The first ion exchange resin column 34 has, for example, a cylindrical container and the first ion exchange resin filling up the container. The container is filled up with a plurality of particles of the first ion exchange resin, with gaps left for serving as channels for the water, and the fresh water entering the first ion exchange resin column 34 passes between the first ion exchange resin particles in the container.

For example, the container accommodates a mixture of ion exchange resin for exchange of cations (cation exchange resin) and ion exchange resin for exchange of anions (anion exchange resin), as the first ion exchange resin. Of ions contained in the water supplied to the first ion exchange resin column 34, ions other than hydrogen ions and hydroxide ions are exchanged with hydrogen ions and hydroxide ions.

In other words, the first ion exchange resin column 34 puts the fresh water drawn up by the second pump 32 into contact with the ion exchange resin, to thereby purify the fresh water to produce high-purity water (pure water). Note that the composition of the first ion exchange resin is not limited to the one mentioned above and may have any composition that can purify fresh water to produce pure water.

An outlet of the first ion exchange resin column 34 is connected to a precision filter 36 through a channel 10. Hence, the pure water obtained by ion exchange by the first ion exchange resin passes through the channel 10 to reach the precision filter 36. The precision filter 36 has a function of filtering the water (pure water) having undergone the ion exchange by the first ion exchange resin column 34.

Like the filter 26, the precision filter 36 includes a filter (not illustrated) formed of, for example, activated carbon, zeolite, cloth, resin-made fibers, glass fibers, a metallic mesh, an RO membrane, or the like.

In the process in which the water supplied through the channel 20 to the water producing apparatus 4 passes through the channels 60, 62, 64, 66, 68, and 10, clarification of the water progresses, and, in a final stage of the clarification, the water reaches the precision filter 36. Since the impurities contained in the pure water passing through the precision filter 36 are extremely small and in a tiny quantity, the precision filter 36 is required to have a performance suitable for removal of such impurities. For example, it is preferable that a membrane finer than the filter 26 be used for the precision filter 36.

The precision filter 36 adsorbs or filters out the extremely tiny amount of impurities contained in the water flowing thereinto, to thereby further clarify the pure water supplied from the first ion exchange resin column 34. An outlet of the precision filter 36 is connected through a channel 70 to a first specific resistance meter 38 for measuring the specific resistance of the pure water. Hence, the pure water filtered by the precision filter 36 passes through the channel 70 toward the downstream side to reach the first specific resistance meter 38.

The specific resistance of water is higher as the amount of impurities contained in the water is smaller. Hence, when the specific resistance of the water (pure water) is measured by the first specific resistance meter 38, it is possible to determine whether or not the purified pure water has such water quality that the pure water can be reused in the processing apparatus 8 as cleaning water or the like. For example, the first specific resistance meter 38 is connected to the control unit 12, and a determination threshold of specific resistance for determining that the pure water has such water quality that the pure water can be used as cleaning water is registered in the storage device 16 of the control unit 12. Herein, the specific resistance of the pure water to be supplied to the processing apparatus 8 is not less than 12 MΩ·cm, so that the determination threshold is, for example, set at 12 MΩ·cm.

An inlet side of a selector valve 40 is connected to an outlet side of the first specific resistance meter 38 through a channel 72. Hence, the water (pure water) of which the specific resistance has been measured by the first specific resistance meter 38 flows into the selector valve 40 through the channel 72.

A channel 42 communicating with the first tank 22 and the channel 44 communicating with the water adjusting apparatus 6 are connected to an outlet side of the selector valve 40. The selector valve 40 is, for example, a solenoid valve connected to the control unit 12. The selector valve 40 has a function of changing over the destination of the water flowing thereinto from the channel 72 to either one of the channel 42 and the channel 44.

Incidentally, when the specific resistance of the water (pure water) measured by the first specific resistance meter 38 does not exceed the predetermined threshold, this means that the water quality of the water (pure water) does not satisfy such a level that the water (pure water) can be used as water to be supplied to the processing apparatus 8. In view of this, for example, the control unit 12 determines whether or not the specific resistance of the water (pure water) measured by the first specific resistance meter 38 is in excess of the predetermined threshold.

In the case where the control unit 12 determines that the specific resistance of the water (pure water) measured by the first specific resistance meter 38 is not in excess of the predetermined threshold, the control unit 12 controls the selector valve 40 to change over the destination of the water to the channel 42, to thereby send the water to the first tank 22. In other words, the water of such a water quality as not to satisfy a predetermined level is again clarified by the water producing apparatus 4, together with the water which has been stored in the first tank 22. As a result, the water stored in the first tank 22 is gradually clarified.

On the other hand, in the case where the control unit 12 determines that the specific resistance of the water (pure water) measured by the first specific resistance meter 38 is in excess of the predetermined threshold, the control unit 12 controls the selector valve 40 to change over the destination of the water to the channel 44. As a result, the pure water confirmed to have a water quality satisfying a predetermined level is supplied to the water adjusting apparatus 6.

Figure 3:
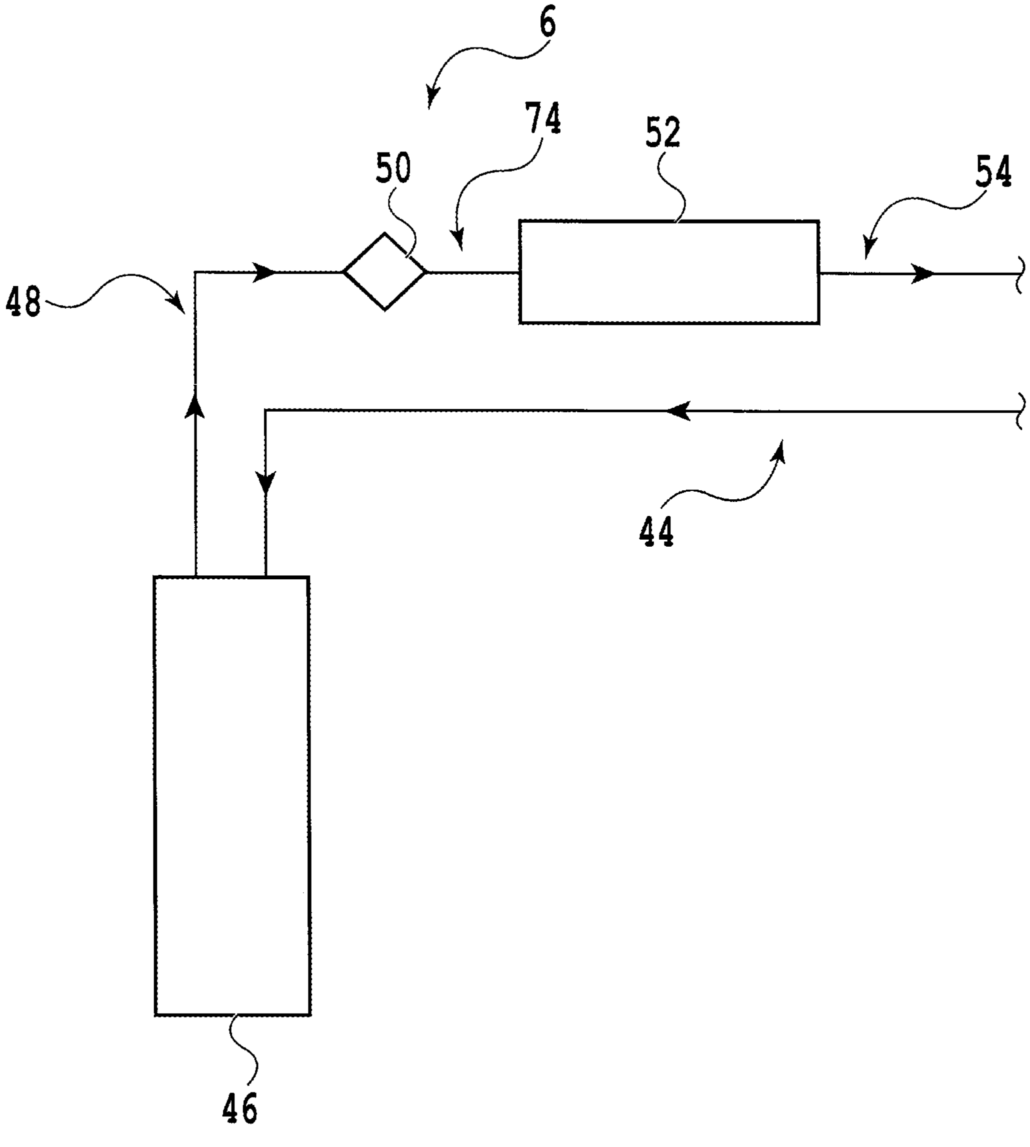
FIG. 3 is a diagram schematically depicting a configuration of a water adjusting apparatus depicted in FIG. 1.

Next, the water adjusting apparatus 6 will be described. FIG. 3 is a diagram schematically depicting a configuration of the water adjusting apparatus 6 depicted in FIG. 1. As depicted in FIG. 3, a second ion exchange resin column 46 including second ion exchange resin is connected to an end on the downstream side of the channel 44 from the water producing apparatus 4. The second ion exchange resin column 46 exchanges ions arising from impurities or the like which may mix into the pure water when the pure water is produced by the water producing apparatus 4 and supplied to the water adjusting apparatus 6 through the channel 44.

Like the first ion exchange resin column 34, the second ion exchange resin column 46 has, for example, a cylindrical container and second ion exchange resin filling up the container. The container is filled up with a plurality of particles of the ion exchange resin, with gaps left for serving as channels for the water, and the pure water entering the second ion exchange resin column 46 passes between the second ion exchange resin particles in the container. Note that, like the first ion exchange resin, the composition of the second ion exchange resin is not limited to the one mentioned above and the second ion exchange resin may have any composition that can remove the impurities mixed in the pure water to purify the pure water to have purity of a predetermined level.

An outlet of the second ion exchange resin column 46 is connected to a precision filter 50 through a channel 48. Hence, the pure water obtained by the ion exchange by the second ion exchange resin passes through the channel 48 to reach the precision filter 50. The precision filter 50 has a function of finally filtering the water (pure water) having undergone the ion exchange by the second ion exchange resin column 46.

Like the precision filter 36, the precision filter 50 includes a filter (not illustrated) formed of, for example, activated carbon, zeolite, cloth, resin-made fibers, glass fibers, a metallic mesh, an RO membrane, or the like. Since impurities mixed in the pure water passing through the precision filter 50 are extremely small and in a tiny quantity, the precision filter 50 is required to have a performance suitable for removal of such impurities. For example, it is preferable that, like the precision filter 36, the precision filter 50 be formed by use of a membrane finer than the filter 26.

The precision filter 50 absorbs or filters out the extremely tiny amount of impurities contained in the water flowing thereinto, to thereby further clarify the water. A downstream side of the precision filter 50 is connected to a second specific resistance meter 52 through a channel 74. The pure water filtered by the precision filter 50 passes through the channel toward the downstream side, to reach the second specific resistance meter 52 for measuring the specific resistance of the pure water immediately before supply of the pure water to the processing apparatus 8.

Like the first specific resistance meter 38, the second specific resistance meter 52 is connected, for example, to the control unit 12, and such a determination threshold of specific resistance that it can be determined that the pure water has such a water quality as to be able to be used as cleaning water is registered in the storage device 16 of the control unit 12. Herein, the specific resistance of the pure water to be supplied to the processing apparatus 8 is not less than 12 MΩ·cm, so that the determination threshold is set at, for example, 12 MΩ·cm.

In the case where it is found, as a result of measurement by the second specific resistance meter 52, that the specific resistance of the pure water is not less than the determination threshold of 12 MΩ·cm, the pure water flows through the channel 54 to be supplied to the processing apparatus 8. On the other hand, in the case where the specific resistance of the pure water is lower than the determination threshold of 12 MΩ·cm, the pure water is not supplied to the processing apparatus 8.

The water supply system 2 may include means for informing a user of the situation in the case where the specific resistance of the pure water measured by the first specific resistance meter 38 is determined by the control unit 12 to be lower than the predetermined threshold. For example, the water supply system 2 may include a monitor, and it may be displayed on the monitor that the specific resistance measured by the second specific resistance meter 52 is lower than the determination threshold of 12 MΩ·cm. Alternatively, the water supply system 2 may include an alarm device, and alarm sound may be issued in the case where the specific resistance measured by the second specific resistance meter 52 is lower than the determination threshold of 12 MΩ·cm.

In addition, a valve capable of adjusting the flow rate of the water may be provided at an intermediate position of the channel 54 connecting the second specific resistance meter 52 of the water adjusting apparatus 6 and the processing apparatus 8. In the case where the specific resistance measured by the second specific resistance meter 52 is lower than the determination threshold of 12 MΩ·cm, the user can prevent the pure water not having purity of a predetermined level from being supplied to the processing apparatus 8, by closing the valve.

As has been described above, the water supply system 2 of the present embodiment includes the ion exchange resin column and the specific resistance meter in each of the water producing apparatus 4 and the water adjusting apparatus 6, and the water supplied from the water producing apparatus 4 is adjusted by the water adjusting apparatus 6, before being supplied to the processing apparatus 8. Hence, where the water adjusting apparatus 6 in the water supply system 2 is disposed near the processing apparatus 8, it is thereby ensured that the water adjusted to have purity higher than a predetermined level can be supplied from the water adjusting apparatus 6 to the processing apparatus 8, irrespectively of the distance from the water producing apparatus 4 to the processing apparatus 8.

For example, even in the case where the water producing apparatus 4 is installed outside a room (clean room or the like) in which the processing apparatus 8 is installed because of various restrictions such as a limited installation space, the water to be supplied to the processing apparatus 8 can be adjusted by the water adjusting apparatus 6 to have purity not less than a predetermined level, if the water adjusting apparatus 6 is installed inside the room, particularly, at a position near the processing apparatus 8. Hence, even in the case where the water producing apparatus 4 is far from the processing apparatus 8 and the piping from the water producing apparatus 4 to the processing apparatus 8 is long, water of high purity can be supplied to the processing apparatus 8.

Figure 4:
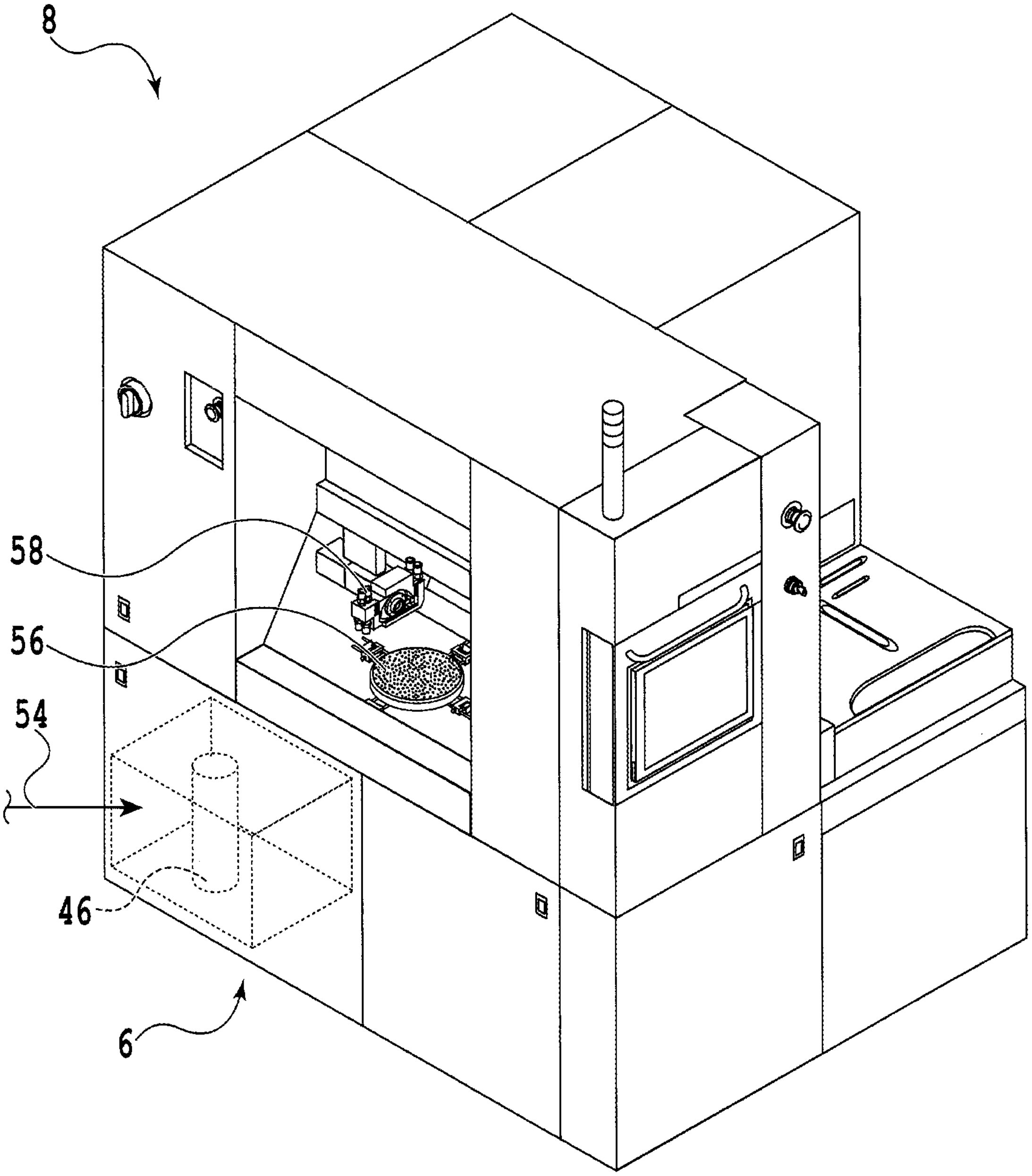
FIG. 4 is a perspective view schematically depicting a processing apparatus and the water adjusting apparatus.

FIG. 4 is a perspective view schematically depicting the processing apparatus 8 and the water adjusting apparatus 6. In FIG. 4, a cutting apparatus including a holding table 56 and a cutting unit 58 is illustrated as an example of the processing apparatus 8. As depicted in FIG. 4, the water adjusting apparatus 6 according to the present embodiment is one that includes the second ion exchange resin column 46 and the second specific resistance meter 52, and has a compact configuration.

Hence, the water adjusting apparatus 6 can be accommodated in a housing of the processing apparatus 8. In this case, the distance from the water adjusting apparatus 6 to the processing apparatus 8 is substantially zero, so that, when the water adjusted to have purity not less than a predetermined level by the water adjusting apparatus 6 is supplied from the water adjusting apparatus 6 to the processing apparatus 8, the possibility that this water may be contaminated by impurities can be suppressed to a low level.

Other than the above points, the structures, methods, and the like according to the above-described embodiment and modifications can be appropriately modified in carrying out the present invention insofar as the modifications do not depart from the scope of the object of the invention.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A water supply system for supplying water to be used in a processing apparatus, the water supply system comprising:

a water producing apparatus including a first inlet and a first outlet, a first ion exchange resin column connected to the first inlet and containing first ion exchange resin, wherein water received from the first inlet contacts the first ion exchange resin in the first ion exchange resin column, and a first specific resistance meter measures a specific resistance of the water having made contact with the first ion exchange resin, and when a first resistance of the water measured by the first specific resistance meter is at or greater than a first predetermined threshold level, the water exits the first specific resistance meter and moves through the first outlet; and a water adjusting apparatus including a second inlet and a second outlet, wherein the second inlet receives the water from the first outlet, a second ion exchange resin column connected to the second inlet and containing second ion exchange resin, wherein the water received from the second inlet contacts the second ion exchange resin in the second ion exchange resin column, and a second specific resistance meter measures a specific resistance of the water having made contact with the second ion exchange resin, and when a second resistance of the water measured by the second specific resistance meter is at or greater than a second predetermined threshold level, the water exits the second specific resistance meter and is supplied to a processing apparatus.

2. The water supply system according to claim 1, wherein the water producing apparatus is disposed outside a clean room in which the processing apparatus is installed, and the water adjusting apparatus is disposed inside the clean room.

3. The water supply system according to claim 1, wherein the water adjusting apparatus is installed inside a housing of the processing apparatus.

4. The water supply system according to claim 2, wherein the water adjusting apparatus is installed inside a housing of the processing apparatus.

5. The water supply system according to claim 1, wherein a first filter is positioned between the first ion exchange resin column and the first specific resistance meter, and a second filter is positioned between the second ion exchange resin column and the second specific resistance meter, said first filter and second filter are different.

6. The water supply system according to claim 1, further comprising a selector valve positioned between the first specific resistance meter and the second ion exchange resin column, wherein the selector valve selectively directs the water back to the first ion exchange resin column when the resistance measured by the first specific resistance meter is less than a predetermined threshold, and wherein the selector valve selectively directs the water through the first outlet when the resistance measured by the first specific resistance meter is equal to or greater than the predetermined threshold.

7. The water supply system according to claim 6, further comprising a first tank between the selector valve and the first ion exchange resin column, wherein the first tank stores the water.

8. The water supply system according to claim 7, further comprising a second tank connected to the first tank and positioned between the first tank and the first ion exchange resin column, wherein the second tank includes a ultra-violet light source.

* * * * *